United States Patent [19]

Ono et al.

[11] 3,769,104

[45] Oct. 30, 1973

[54] METHOD OF PREVENTING AUTODOPING DURING THE EPITAXIAL GROWTH OF COMPOUND SEMICONDUCTORS FROM THE VAPOR PHASE

[75] Inventors: Yuichi Ono, Kokubunji; Masahiko Ogirima, Tokyo; Hiroyuki Kasano, Akishima; Kazuhiro Kurata, Hachioji, all of Japan

[73] Assignee: Hitachi, Ltd., Tokyo, Japan

[22] Filed: Mar. 19, 1971

[21] Appl. No.: 125,943

[30] Foreign Application Priority Data

Mar. 27, 1970 Japan .............................. 45/25276

[52] U.S. Cl. .......... 148/175, 117/106 A, 117/107.2, 117/201, 148/174

[51] Int. Cl. ......................... H01l 7/36, C23c 11/00

[58] Field of Search ........................... 148/174, 175; 117/106, 107.2, 201

[56] References Cited

UNITED STATES PATENTS

| | | | |
|---|---|---|---|
| 3,296,040 | 1/1967 | Wigton | 148/175 |
| 3,663,319 | 5/1972 | Rose | 148/175 |

FOREIGN PATENTS OR APPLICATIONS

| | | | |
|---|---|---|---|
| 1,099,098 | 1/1968 | Great Britain | 148/175 |

OTHER PUBLICATIONS

Lawley, K. L., "Vapor Growth Parameters–Vapor Process" J. Electrochem. Soc., Vol. 113, No. 3, March 1966, pp. 240–245.

Mayer et al. "Epitaxial Deposition–Pyrolysis of Silane" Ibid., Vol. 111, No. 5, May, 1964, pp. 550–556.

Joyce et al. "Impurity Redistribution–Silicon Layers" Ibid., Vol. 112, No. 11, November 1965, pp. 1100–1106.

Gupta et al. "Silicon Epitaxial Layers–Impurity Profiles" Ibid., Vol. 116, No. 11, Nov. 1969, pp. 1561–1565.

Doo et al. "Growing High Resistivity–Silicon Substrates" IBM Tech. Discl. Bull., Vol. 5, No. 2, July 1962, pp. 50–51.

Ladd et al. "Autodoping Effects at the Interface of GaAs–Gr Heterojunctions" Metallurgical Trans. Vol. 1, Mar. 1970, p. 609–616.

*Primary Examiner*—L. Dewayne Rutledge
*Assistant Examiner*—W. G. Saba
*Attorney*—Craig, Antonelli, Stewart & Hill

[57] ABSTRACT

A method of epitaxially growing compound semiconductors from the vapor phase, wherein a dual layer of an insulating glass layer, such as $SiO_2$ or $Si_3N_4$ and Si is deposited on the entire surface of a germanium or III–V compound semiconductor substrate by a chemical vapor phase deposition method, the dual layer on the germanium or III–V compound semiconductor substrate surface is mechanically removed, and then a compound semiconductor is epitaxially grown on the substrate surface.

9 Claims, 7 Drawing Figures

INVENTORS
YUICHI ONO, MASAHIKO OGIRIMA,
HIROYUKI KASANO AND KAZUHIRO KURATA

BY Craig, Antonelli, Stewart & Hill
ATTORNEYS

INVENTORS

YUICHI ONO, MASAHIKO OGIRIMA,
HIROYUKI KASANO AND KAZUHIRO KURATA

BY Craig, Antonelli, Stewart & Hill
ATTORNEYS

METHOD OF PREVENTING AUTODOPING DURING THE EPITAXIAL GROWTH OF COMPOUND SEMICONDUCTORS FROM THE VAPOR PHASE

This invention relates to a method of epitaxially growing a compound semiconductor on the surface of a germanium or III–V compound semiconductor substrate from the vapor phase.

According to a conventional method of growing an epitaxial layer (homoepitaxial layer or heteroepitaxial layer) on the surface of a low resistivity semiconductor substrate from the vapor phase, the back surface of the substrate is coated in advance with a high resistivity GaAs epitaxial film when GaAs is made to grow, or an $SiO_2$ film is deposited in advance on the back surface of a semiconductor substrate such as Ge, Si, InSb, etc. by a technique of chemical vapor deposition (hereinafter referred to as a CVD method) in case of an epitaxial growth of semiconductor materials for injection luminescence such as GaP, $GaAs_{1-x}P_x$ where $0 < x < 1$, etc. in order to prevent an epitaxially grown layer from being autodoped with impurities from the back surface of the substrate or with a component of the substrate or to prevent the etching (gas etching due to halides during the process of growth) of the back surface.

According to the method described above, however, the $SiO_2$ film is etched by the following chemical reactions between $SiO_2$ and a Group III element of the Periodic Table supplied from the vapor phase when, for example, a Ga compound is grown from the vapor phase $$4Ga + SiO_2 \rightarrow 2Ga_2O\uparrow + Si$$

$$Si + SiO_2 \rightarrow 2SiO\uparrow$$

$$2Ga + SiO_2 \rightarrow SiO\uparrow + Ga_2O\uparrow,$$

where the upright arrow ↑ designates evaporation. Particularly, when P is used as the Group V element for a III–V compound semiconductor to be grown epitaxially, P fiercely reacts with $SiO_2$ above 750°C to form phosphosilicate glass and further $SiO_2$ is etched. Thus, it has been difficult to prevent the etching of the back surface of the substrate. The conventional method suffers from the further disadvantage that Si is mixed into the epitaxial layer from the etched $SiO_2$ film.

In order to obviate the difficulties described above, a Ge substrate has been coated with polycrystalline silicon by the CVD method in case of a germanium substrate.

Figure 1:
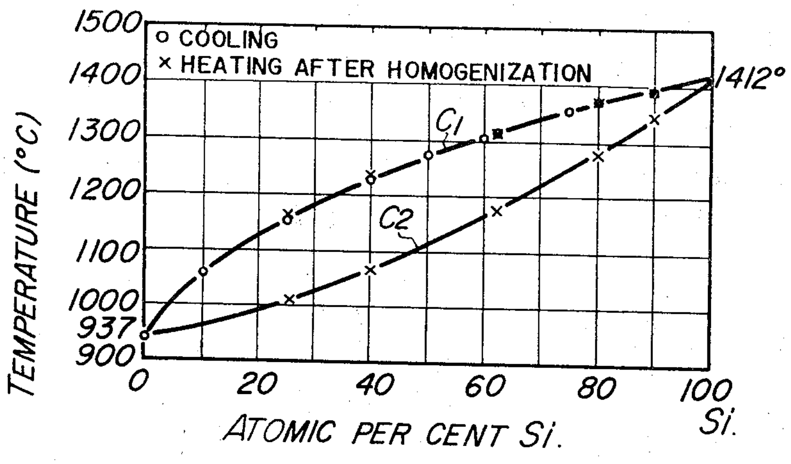

As will be understood from the Ge-Si phase diagram of FIG. 1 (the ordinate denotes temperature and the abscissa denotes atomic percent of silicon), Ge-Si forms continuous series of solid solution between 937°C which is the melting point of Ge and 1,412°C which is the melting point of Si.

In FIG. 1, circles represent measured points of the exothermic process of the mixture Ge-Si, the mixture ratio of which is shown at the abscissa of FIG. 1 in atomic percent of Si, occuring when the mixture is cooled from the molten state. Therefore, the curve $C_1$ is a cooling curve in the thermal analysis. On the other hand, crosses represent measured points of the endothermic process occurring when the mixture is heated from a low temperature. The curve $C_2$ therefore is a heating curve in the thermal analysis. Further, since the temperature for epitaxial growth does not exceed the melting point of Ge, no liquid phase appears in Ge-Si. The vapor pressure of Si at 900°C is about $10^{-9}$ Torr and the influence of doping Si from the vapor phase may be neglected. However, since the physical constants, particularly the thermal expansion coefficients are different between Si and a substrate on which Si is to be deposited, when polycrystalline silicon is grown directly; on the substrate, thermal stress occurs to cause lattice defect in the substrate crystal or to prevent deposition with sufficient adhesion.

This invention relates to a coating film for preventing the etching of the back surface of a substrate or the autodoping of the epitaxial layer due to the etching of the back surface of the substrate when an epitaxial layer is grown on the surface of a Ge or III–V compound semiconductor substrate from the vapor phase.

An object of this invention is to provide a coating film which can completely prevent the etching and evaporation of the back surface of the substrate.

Another object of this invention is to provide a simple and convenient method of depositing a coating film for growing an epitaxial layer on the Ge or III–V compound semiconductor substrate.

According to this invention, the foregoing difficulties of a conventional coating film occurring between a substrate surface and Si are overcome by the double process in which an insulating (porous) glass layer such as $SiO_2$ or $Si_3N_4$ is deposited on the surface of a Ge or III–V compound semiconductor substrate and then Si is deposited continuously on the substrate.

Since the coating film of this invention can be deposited not only on the back surface of the substrate, but also on side surfaces, a high purity epitaxial layer may be obtained.

Figure 3:
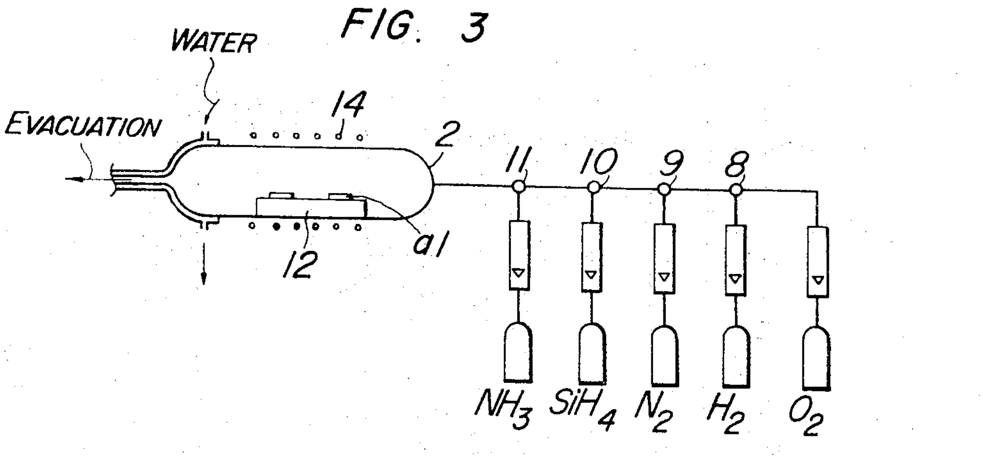

Other objects, features and advantages of this invention will become more apparent from the following detailed description of the invention when taken in conjunction with the accompanying drawings, in which:

FIG. 1 is a Ge-Si phase diagram,

FIGS. 2 *a* through 2*e* are diagrams showing the manufacturing processes of a coating film for preventing the etching and evaporation of a substrate in case of growing an epitaxial layer of compound semiconductor, and FIG. 3 shows a device for CVD film deposition used in the process of forming the coating film shown in FIG. 2.

Now, an embodiment of this invention will be described.

Figure 2A:
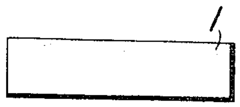

EMBODIMENT a. A substrate 1 of Ge or III–V semiconductor, such as GaAs having a lapped surface as shown in FIG. 2*a* is prepared.

Figure 2B:
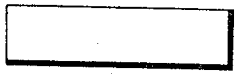

After a principal surface (hereinafter referred to as the substrate surface) of the substrate is lapped with No. 4,000 alumina powder, the surface is polished to a mirror-like surface and the substrate specularly finished as shown in FIG. 2*b* by being exposed to an etchant such as, for example, the CP4 solution for a Ge substrate and a mixture of $H_2SO_4 : H_2O_2 : H_2O = 5 : 1 : 1$ for a GaAs substrate.

b. The substrate treated in the process (a) is inserted into a CVD device 2 as shown in FIG. 3. When an $SiO_2$ film is deposited on the substrate by the CVD method in this device, an $SiH_4$ bomb 3, an $N_2$ bomb 4 and an $O_2$ bomb 6 are used.

The conditions for chemical vapor deposition of $SiO_2$ are such that the flow rates of $N_2$ gas; $SiH_4$ gas and $O_2$ gas are 5 l/min., 35 cc/min. and 0.3 l/min., respectively, and the temperature of the substrate 1 is 300°–500°C. For chemical vapor deposition of $Si_3N_4$, the flow rates of $N_2$ gas, $NH_3$ gas and $SiH_4$ gas are 15 l/min., 200 cc/min. and 4 cc/min., respectively, and the substrate temperature is 600°–800°C.

Incidentally, the chemical reactions in the above CVD methods are as follows.

In case of chemical vapor deposition of $SiO_2$, $$SiH_4 + O_2 \rightarrow SiO_2 \downarrow + 2H_2$$

or $$SiH_4 + 2O_2 \rightarrow SiO_2 \downarrow + 2H_2O.$$

In case of CVD of $Si_3N_4$, $$3SiH_4 + 4NH_3 \rightarrow Si_3N_4 \downarrow + 12H_2.$$

Figure 2C:
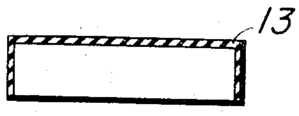

In the above formulas, the downward arrow $\downarrow$ designates deposition. By the above reactions, an $SiO_2$ or $Si_3N_4$ film 13 of about 1,000–3,000 A thickness is obtained as shown in FIG. 2*c*.

c. After cocks denoted by 8, 9, 10 and 11 in FIG. 3 are turned over and $H_2$ gas 5 is allowed to flow to fill the reaction tube therewith, the output of a heating device 14 is adjusted to raise the temperature of the substrate to 750°–850°C.

Figure 2D:
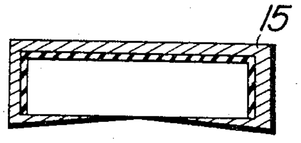
Figure 2E:
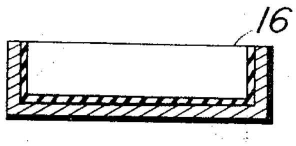

Then, the $SiH_4$ bomb 3 is opened to flow an appropriate amount of $SiH_4$ gas to deposite a silicon polycrystalline film 15 of desired thickness around 1$\mu$ on the $SiO_2$ or $Si_3N_4$ film 13 as shown in FIG. 2*d*.

d. The heating device 14 is turned off to reduce the substrate temperature and the substrate is taken out at room temperature.

e. The principal surface 16 of the substrate for epitaxial growth is lapped with an abrasive of No. 4000 and polished to a mirror-like surface by buffing, chemical etching, etc.

f. Then, after sufficiently cleaned and dried the substrate is inserted into an epitaxial reaction furnace. When an epitaxial layer of compound semiconductor is grown on the substrate surface by a known method of epitaxial growth (for example, GaP, GaAs or $GaAs_{1-x}P_x$, where $.<x<1$, is grown on a GaAs or Ge substrate), no change is recognized in the coating film on the back surface (an $SiO_2$—Si polycrystalline dual layer or $Si_3N_4$—Si polycrystalline dual layer) after the epitaxial growth.

When an epitaxial layer of $GaAs_{1-x}P_x$ crystal ($o<x<1$) is grown on a Ge substrate from the vapor phase by the method of this invention, the carrier density due to Ge introduced into the grown layer is $1 \times 10^{15}$ cm$^{-3}$. This fact indicates that autodoping of an epitaxial layer from Ge substrate is substantially suppressed by the dual coating film of $SiO_2$—Si or $Si_3N_4$—Si of this invention.

What we claim is:

1. A method of epitaxially growing a compound semiconductor from the vapor phase, comprising, in combination, the steps of:

coating the exposed surfaces of a substrate selected from the group consisting of germanium and a III–V compound semiconductor with an insulating glass layer by chemical vapor deposition;

further coating said insulating layer with a silicon layer;

removing the resultant dual layer of insulating glass and silicon from a surface of said germanium or III–V compound substrate on which an epitaxial layer is to be grown; and epitaxially growing a compound semiconductor on said substrate surface from which said dual layer is removed.

2. A method according to claim 1, wherein said insulating glass is one selected from the group consisting of $SiO_2$ and $Si_3N_4$.

3. A method according to claim 1, wherein said substrate is germanium and said insulating glass layer is $SiO_2$.

4. A method according to claim 1, wherein said substrate is selected from the group consisting of germanium and GaAs.

5. A method according to claim 1, wherein said substrate is GaAs.

6. A method according to claim 5, wherein said insulating glass is selected from the group consisting of $SiO_2$ and $Si_3N_4$.

7. A method according to claim 1, wherein said epitaxially grown compound semiconductor is at least one selected from the group consisting of GaP, GaAs, and $GaAs_{1-x}P_x$, wherein $.<x<1$.

8. A method according to claim 1, wherein said dual layer is formed of an insulating glass consisting of $SiO_2$ and polycrystalline silicon.

9. A method according to claim 1, wherein said dual layer is formed of an insulating glass consisting of $Si_3N_4$ and polycrystalline silicon.

* * * * *